US009438017B2

(12) United States Patent
Irons et al.

(10) Patent No.: US 9,438,017 B2
(45) Date of Patent: Sep. 6, 2016

(54) MULTI-POSITION INPUT CORD ASSEMBLY FOR A POWER DISTRIBUTION UNIT

(71) Applicant: Server Technology, Inc., Reno, NV (US)

(72) Inventors: Travis Irons, Reno, NV (US); Mark Ramsey, Reno, NV (US); Chris Connolly, Reno, NV (US)

(73) Assignee: Server Technology, Inc., Reno, NV (US)

( * ) Notice: Subject to any disclaimer, the term of this patent is extended or adjusted under 35 U.S.C. 154(b) by 90 days.

(21) Appl. No.: 13/952,234

(22) Filed: Jul. 26, 2013

(65) Prior Publication Data

US 2014/0041929 A1 Feb. 13, 2014

Related U.S. Application Data

(60) Provisional application No. 61/675,921, filed on Jul. 26, 2012.

(51) Int. Cl.
*H02G 3/08* (2006.01)
*H01R 13/58* (2006.01)

(52) U.S. Cl.
CPC ............ *H02G 3/08* (2013.01); *H01R 13/5841* (2013.01); *Y10T 29/49117* (2015.01)

(58) Field of Classification Search
CPC .......... H02G 3/08; H02G 3/081; H02G 3/26; H02G 3/24; H02G 3/28; H02G 3/00; H01R 13/5841; H01R 13/5845; H01R 13/5829; Y10T 29/49117

USPC .......... 174/542, 60, 74 R, 86, 72 A, 87, 535, 174/494; 439/13, 447, 310, 98, 23
See application file for complete search history.

(56) References Cited

U.S. PATENT DOCUMENTS 3,950,052 A * 4/1976 Walter et al. ................ 439/447
4,003,616 A * 1/1977 Springer ........................ 439/23

(Continued)

FOREIGN PATENT DOCUMENTS

CN 201243153 Y 5/2009
JP H01164687 U 11/1989

(Continued)

OTHER PUBLICATIONS

International Search Report and Written Opinion of International Application No. PCT/US2013/052345; Date of Mailing: Nov. 18, 2013; 10 pages.

(Continued)

*Primary Examiner* — Angel R Estrada
(74) *Attorney, Agent, or Firm* — Perkins Coie LLP

(57) ABSTRACT

Apparatuses and devices are provided that allow for a power input cord to be placed in two or more different orientations relative to a power distribution unit. A power distribution unit may be provided with one or more input cord assemblies that allow an input cord to be swiveled such that the cord exits an outside plane of the power distribution unit at a different angle. Such an assembly allows a power distribution unit to be placed in an equipment rack and coupled with an input power source in a flexible and convenient manner. Clearances and dimensions of equipment racks may be modified to provide enhanced space usage, efficiency, and/or density in a facility.

21 Claims, 9 Drawing Sheets

(56) References Cited

U.S. PATENT DOCUMENTS

| | | | |
|---|---|---|---|
| 4,106,831 A * | 8/1978 | Albrecht | 439/13 |
| 4,959,021 A * | 9/1990 | Byrne | 439/310 |
| 5,697,806 A | 12/1997 | Whiteman, Jr. et al. | |
| 5,735,707 A | 4/1998 | O'Groske | |
| 6,027,352 A | 2/2000 | Byrne | |
| 6,123,573 A | 9/2000 | Savicki, Jr. | |
| 6,152,639 A | 11/2000 | Hsu et al. | |
| 6,220,889 B1 | 4/2001 | Ely et al. | |
| 7,043,543 B2 | 5/2006 | Ewing et al. | |
| 7,074,087 B2 * | 7/2006 | Szczesny et al. | 439/98 |
| 7,990,689 B2 | 8/2011 | Ewing et al. | |
| 8,198,533 B2 * | 6/2012 | Terada et al. | 174/72 A |
| 8,321,163 B2 | 11/2012 | Ewing et al. | |
| 8,450,874 B2 | 5/2013 | Ratcliff et al. | |
| 8,494,661 B2 | 7/2013 | Ewing et al. | |
| 8,662,902 B1 * | 3/2014 | Lai | 439/13 |
| 8,847,759 B2 * | 9/2014 | Bisesti et al. | 439/13 |
| 2010/0163279 A1 | 7/2010 | Ho et al. | |
| 2012/0028498 A1 | 2/2012 | Na et al. | |

FOREIGN PATENT DOCUMENTS

| | | |
|---|---|---|
| JP | 2000252006 A | 9/2000 |
| KR | 20-1998-0055269 U | 7/1998 |
| KR | 10-0843665 B1 | 7/2008 |
| KR | 20100099608 A | 9/2010 |
| KR | 20120011767 A | 2/2012 |

OTHER PUBLICATIONS

International Preliminary Report on Patentability of International Application No. PCT/US2013/052345; Date of Mailing: Jan. 27, 2015; 7 pages.

* cited by examiner

MULTI-POSITION INPUT CORD ASSEMBLY FOR A POWER DISTRIBUTION UNIT

CROSS REFERENCE TO RELATED APPLICATIONS

This application claims priority benefit to U.S. Provisional Patent Application Ser. No. 61/675,921, filed on Jul. 26, 2012, and entitled "MULTI-POSITION INPUT CORD ASSEMBLY FOR A POWER DISTRIBUTION UNIT," the entire disclosure of which is incorporated herein by reference.

FIELD

The present disclosure is directed to power distribution units and, more specifically, to a power distribution unit having a multi-position power input.

BACKGROUND

A conventional Power Distribution Unit (PDU) is an assembly of electrical outlets (also called receptacles) that receive electrical power from a source and distribute the electrical power to one or more separate electronic appliances. Each such unit has a power input that receives power from a power source, and power outlets cords that may be used to provide power to electronic appliances. PDUs are used in many applications and settings such as, for example, in or on electronic equipment racks. One or more PDUs are commonly located in an equipment rack (or other cabinet), and may be installed together with other devices connected to the PDU such as environmental monitors, temperature and humidity sensors, fuse modules, or communications modules that may be external to or contained within the PDU housing. A PDU that is mountable in an equipment rack or cabinet may sometimes be referred to as a Cabinet PDU, or "CDU" for short.

A common use of PDUs is supplying operating power for electrical equipment in computing facilities, such as data centers or server farms. Such computing facilities may include electronic equipment racks that comprise rectangular or box-shaped housings sometimes referred to as a cabinet or a rack and associated components for mounting equipment, associated communications cables, and associated power distribution cables. Electronic equipment may be mounted in such racks so that the various electronic devices are aligned vertically one on top of the other in the rack. One or more PDUs may be used to provide power to the electronic equipment. Multiple racks may be oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

As mentioned, many equipment racks may be located in a data center or server farm, each rack having one or more associated PDUs. Various different equipment racks may have different configurations, including different locations of sources of input power. One or more such data centers may serve as data communication hubs for an enterprise. As will be readily recognized, space within equipment racks is valuable with maximization of computing resources for any given volume being desirable.

SUMMARY

Apparatuses and devices are provided that allow for a power input cord to be placed in two or more different orientations relative to a power distribution unit. A power distribution unit may be provided with one or more input cord assemblies that allow an input cord to be swiveled such that the cord exits an outside plane of the power distribution unit at a different angle. Such an assembly allows a power distribution unit to be placed in an equipment rack and coupled with an input power source in a flexible and convenient manner. Clearances and dimensions of equipment racks may be modified to provide enhanced space usage, efficiency, and/or density in a facility.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

The following patents and patent applications are incorporated herein by reference in their entirety: U.S. Pat. No. 7,043,543, entitled "Vertical-Mount Electrical Power Distribution Plugstrip," issued on May 9, 2006; U.S. Pat. No.

7,990,689, entitled "Power Distribution Unit And Methods Of Making And Use Including Modular Construction And Assemblies," issued on Aug. 2, 2011; U.S. patent application Ser. No. 12/344,419, entitled "Power Distribution, Management, and Monitoring Systems," and filed on Dec. 26, 2008; and U.S. patent application Ser. No. 12/717,879, entitled "Monitoring Power-Related Parameters in a Power Distribution Unit," and filed on Mar. 4, 2010.

Systems and devices are described in which a power input cord for a power distribution unit (PDU) to be placed in two or more different orientations relative to the PDU housing. A PDU may be provided with one or more input cord assemblies that allow an input cord to be swiveled such that the cord may exit an outside plane of the PDU at different angles. Such an assembly allows a PDU to be placed in an equipment rack and coupled with an input power source in a flexible and convenient manner. Clearances and dimensions of equipment racks may be modified to provide enhanced space usage, efficiency, and/or density in a facility. Such an input cord assembly may also allow for more efficient packaging of PDUs for shipment.

Figure 1:
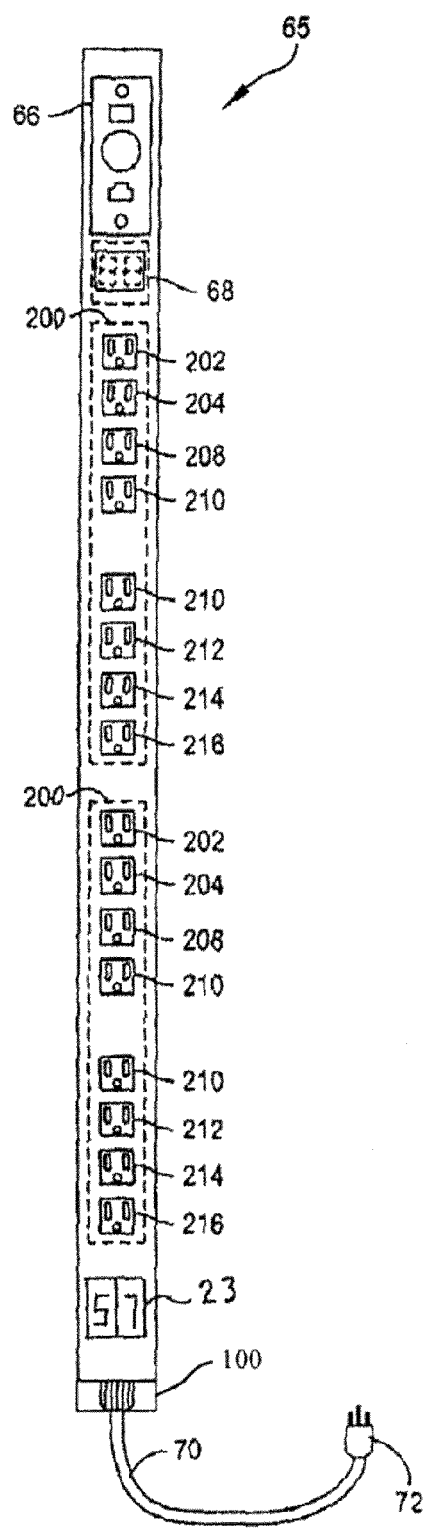
FIG. 1 is an illustration of a face of a power distribution unit in accordance with various embodiments.

FIG. 1 is an illustration of a PDU 65 that includes a swivel input cord assembly 100, Intelligent Power Modules 200, a communications module 66 that provides communications functions, an environmental monitor port 68, and an input power cord 70 with associated plug 72. The PDU 65 according to this embodiment includes a housing that is vertically mountable in an equipment rack, although it will be understood that other form factors may be used, such as a horizontally mountable housing. The Intelligent Power Modules 200 each include eight outlets 202-216 that supply power to assets that may be mounted into an equipment rack. Such equipment racks are well known, and often include several individual assets that are used in operation of a data center. As is well known, numerous equipment racks may be included in a data center, and in various embodiments each asset in each equipment rack may be monitored for power usage through one or more associated IPMs 200. The visual display 23 (shown displaying the numeral "57") is disposed in the PDU 65 although in other embodiments the display might be external to the PDU 65, may display multiple items of information, and/or may include multiple separate displays.

The input cord assembly 100 according to various embodiments includes a swivel assembly that allows the input power cord 70 to exit a plane of the PDU housing at one of multiple different angles. Such an assembly 100 allows input power cord 70 to be situated so as to require fewer bends, or allow bends to be made more easily when connecting the input power cord 70 to a power source. As will be appreciated, equipment racks may have input power provided to the racks in various different locations and orientations. Depending upon where the power source is located in a particular rack, a PDU may be required which has the input power cord coming off, for example, either the front or end of the PDU housing. Thus, PDU configurations may be specifically selected based on the location in an equipment rack for the power source. If such a PDU is later desired to be placed in a different rack, it may not be usable, or may require modification, if the different rack has input power provided at a different location. PDUs provided with an input cord assembly 100 may allow for the input cord 70 to be moved relative to the PDU housing, thus allowing such a PDU to be used in a number of different applications as compared to a PDU which does not have such an input cord assembly 100. Furthermore, such a feature may allow for fewer part numbers and fewer required option selections for suppliers and buyers of PDUs. Additionally, such an input cord assembly 100 may allow a PDUs input power cord 70 to be more conveniently placed in a shipping box for shipment of the PDU, and may allow for a reduced sized shipping box and/or reduced shipping materials when shipping such a PDU. As will be recognized, a reduced size and/or weight box may also result in reduced costs for shipping.

With continued reference to FIG. 1, some other elements of PDU 65 are described. In one embodiment, the power outlet module 200 includes eight outlets (202-216) each of NEMA 5-20R type, contained in a housing. It will be understood that this embodiment, and other embodiments described herein as having NEMA 5-20R type outlets, are exemplary only and that any of various other types of outlets alternatively can be used. For example, the "outlets" can be other NEMA types (e.g., NEMA 5-15R, NEMA 6-20R, NEMA 6-30R or NEMA 6-50R) or any of various IEC types (e.g., IEC C13 or IEC C19). It also will be understood that all "outlets" in a particular power outlet module 200, or other module-outlet described herein, need not be identical or oriented uniformly along the PDU. It also will be understood that the "outlets" are not limited to three-prong receptacles; alternatively, one more of the "outlets" can be configured for two or more than three prongs in the mating male connector. It also will be understood that the "outlets" are not limited to having female prong receptacles. In any "outlet," one or more of the "prong receptacles" can be male instead of female connection elements, as conditions or needs indicate. In general, as used herein, female and male "prong receptacles" are termed "power-connection elements". Furthermore, the principles described herein also are applicable to devices that may be hard-wired into an outlet module. While outlet module 200 of this embodiment includes eight outlets, it will be understood that this is but one example and that an outlet module may include a different number of outlets.

The housing for an outlet module may be any suitable housing for such a device, as is known to one of skill in the art, and may be assembled with other modules in a PDU. Such a housing generally includes a front portion and a rear portion, the front portion is substantially planar, and the rear portion is substantially planar and parallel to the front portion. The housing also includes longitudinally extending side portions and transverse end portions. The front portion, rear portion, side portions, and end portions are generally orthogonal to each other in a generally rectangular or box-type configuration. The housing can be made of any suitable, typically rigid, material, including, for example, a rigid polymeric ("plastic") material. In at least certain embodiments, the front and rear portions are made from an electrically insulative material, whereas in other embodiments conducting materials are used for safe ground bonding. The side portions and the end portions may be integrally formed, optionally along with the front portion or the rear portion. Furthermore, while the outlet module described in this embodiment includes a housing, other embodiments may include an outlet module that does not include a housing. For example, an outlet module may include a number of outlets coupled together with no exterior housing that may then be installed into another piece of equipment. Each outlet 202-216 is interconnected to the power source 32 through any of a number of well known connection schemes, such as spade, lug, plug connectors, screw connectors, or other suitable type of connector. Furthermore, if desired, one or more of these electrical connectors can be located inside the housing or outside the housing, in embodiments where the power outlet module includes a housing.

Figure 2:
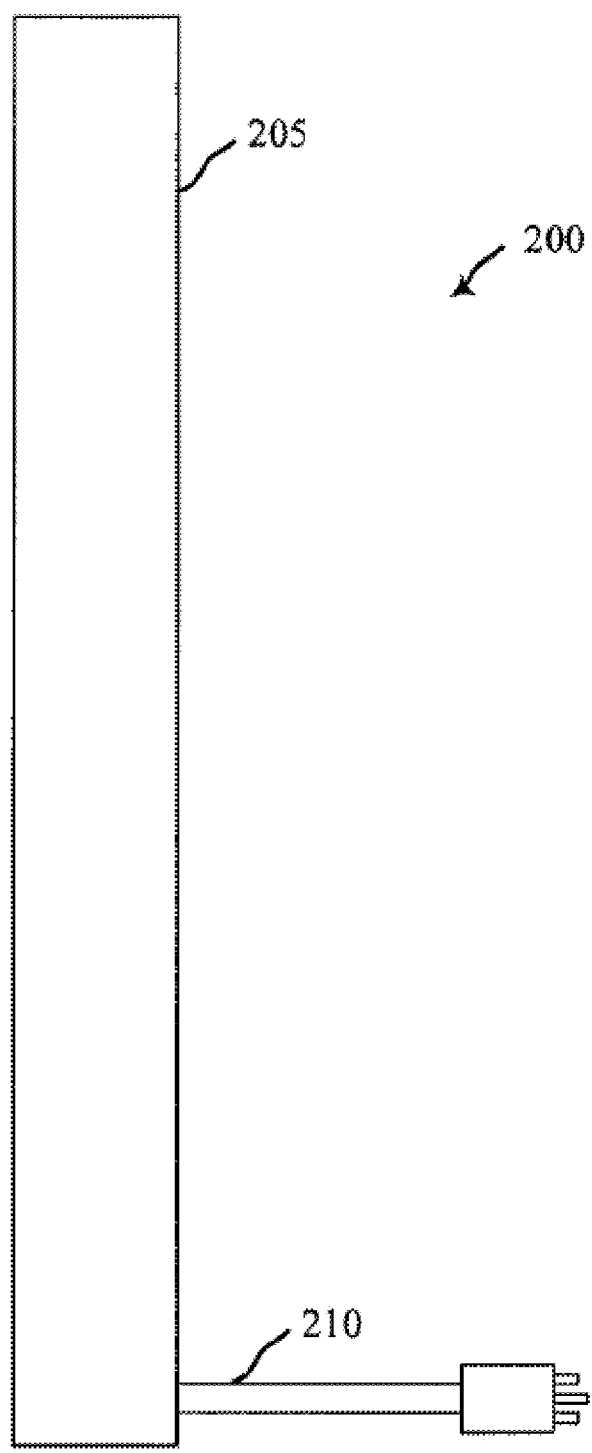
FIGS. 2-4 illustrate a power distribution unit with a cord positioned in various different positions relative to the PDU housing.
Figure 3:
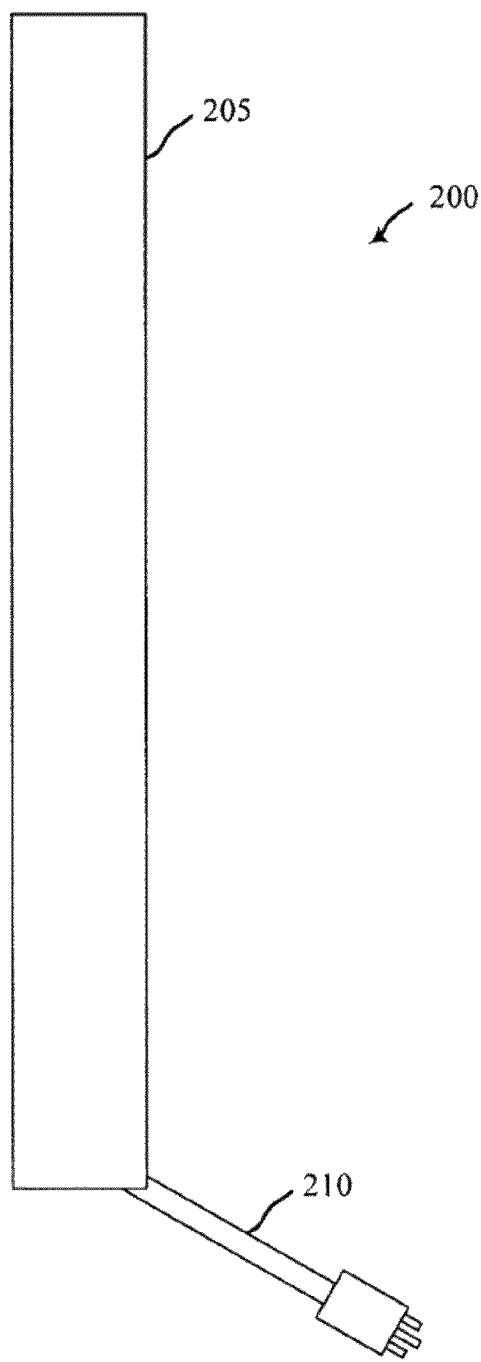
Figure 4:
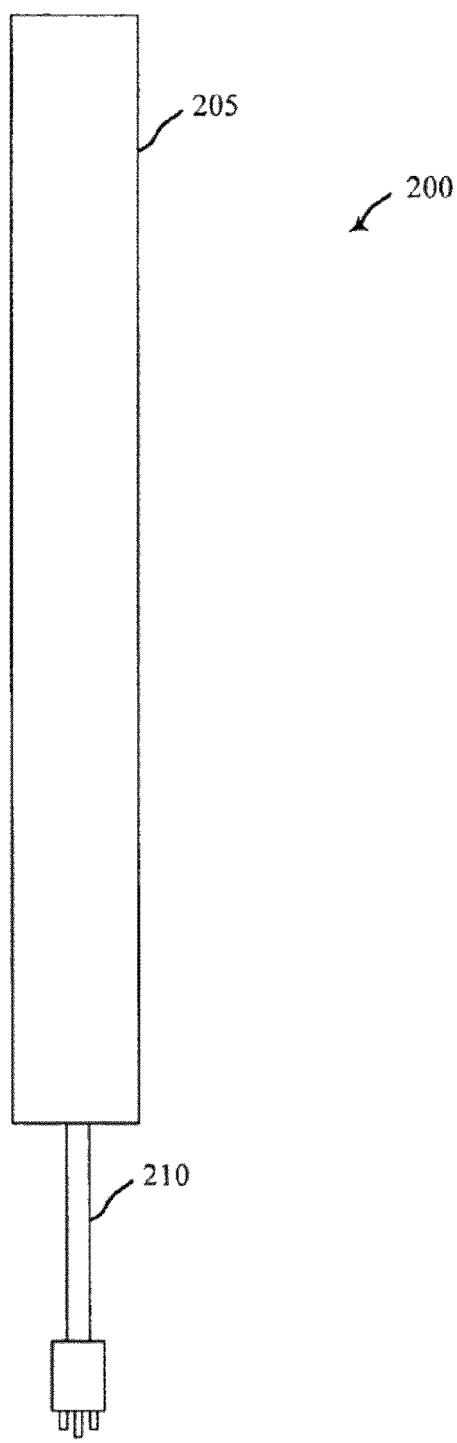

Referring now to FIGS. 2-4, a PDU 200 having an input cord assembly of various embodiments is described. In these illustrations, PDU 200 comprises a PDU housing 205 and an input power cord 210. These figures illustrate a side view of such a PDU 200, which may include a number of outlets on a front and/or rear face thereof. FIG. 2 illustrates input power cord 210 extending away from the PDU housing 205 at about a 90 degree angle relative to the longitudinal axis of the PDU housing 205. FIG. 3 illustrates input power cord 210 extending away from the PDU housing 205 at about a 45 degree angle relative to the longitudinal axis of the PDU housing 205. Finally, FIG. 4 illustrates input power cord 210 extending away from the PDU housing 205 in a direction parallel to the longitudinal axis of the PDU housing 205.

Figure 5:
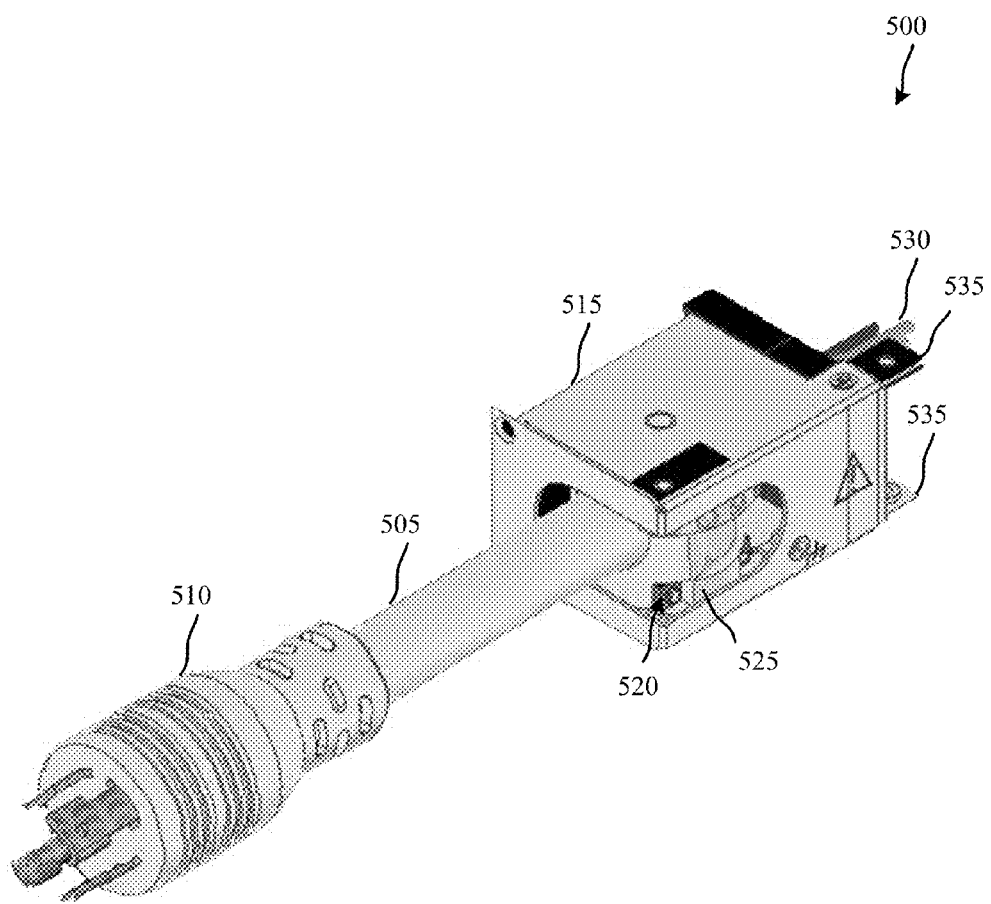
FIGS. 5-7 illustrate several views of an input cord swivel assembly according to various embodiments.
Figure 6:
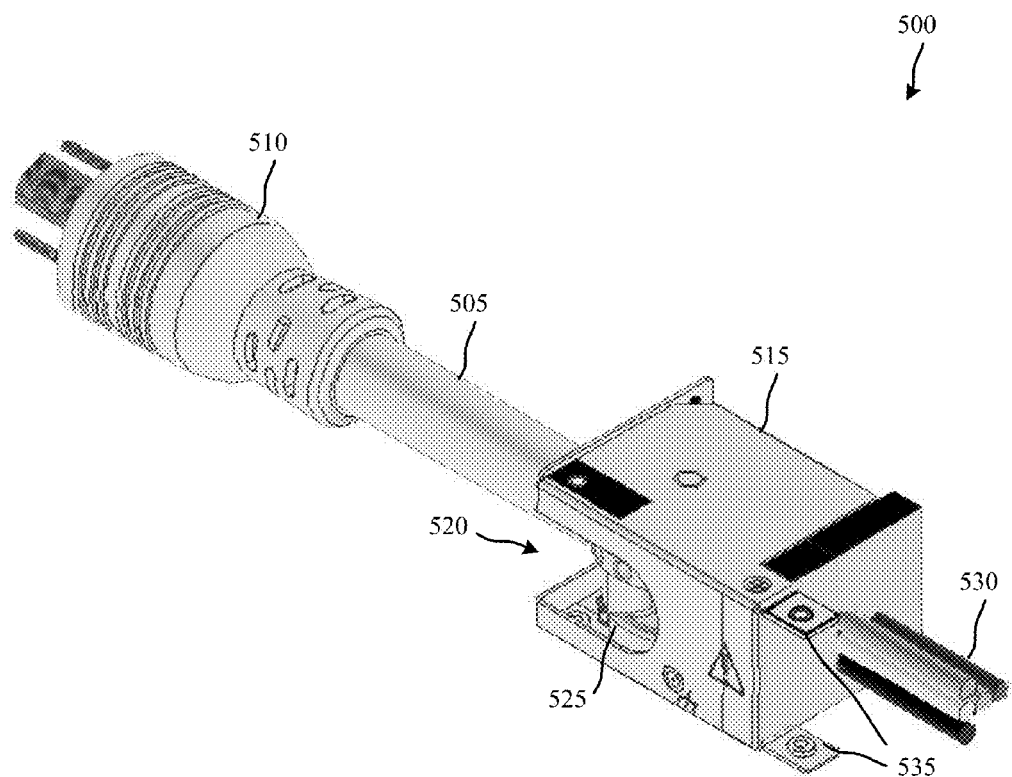
Figure 7:
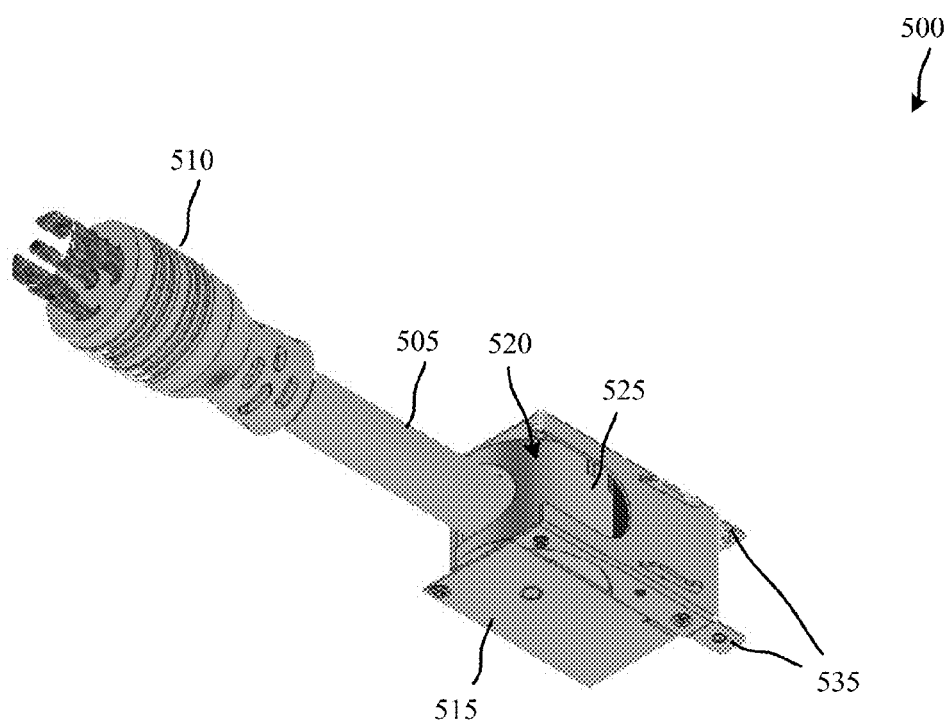

In some embodiments, such as illustrated in FIGS. 5-7, an input cord module 500 may include a swivel assembly that allows input cord 505 to be situated in several different positions. Input cord 505 may include a plug assembly 510 that may be plugged into a receptacle of a power source. It will be understood, however, that other configurations of input power cord 505 and plug 510 may be used, such as different plug configurations or hard wiring of conductors of the input cord 505 to an input power source. The input cord module 500 includes a module housing 515 which has an opening 520 through which the input power cord 505 extends. Power cord 505 is connected to a rotational connection 525, which may be rotated relative to the housing 515. Conductors 530 extend from the housing 515, and may be coupled with other components of a PDU. In the illustrations of FIGS. 5-7 the input cord module 500 includes module connectors 535 that may be coupled with complementary receiving members of other modules that are assembled to form a PDU. In some embodiments, conductors 530 are coupled with the input cord 505 and are provided with sufficient slack within the housing 515 to allow for rotation of the rotational connection 525 through 90 degrees of travel. It will be understood, however, that larger or smaller ranges of rotation for the input cord 505 may be accommodated. The power input cord 505 and plug 510 may have numerous different configurations, as will be readily recognized by one of skill in the art. For example, the input cord 505 and plug 510 may provide a polyphase connection to a power source, such as a three-phase power source. In some embodiments, a PDU may have dual power inputs, with each of the power inputs provided with an input cord module 500. The exit point of the power cord 505 from the rotating input cord module 500 may be oriented such that it minimizes the movement of the wires within the power distribution unit. This is advantageous in that it allows the apparatus to be made smaller, and puts less strain on the point of connection where the wires attach to power distribution unit. The module 500 may also serve as 'strain relief' for the power cord 505, which is associated with safety requirements of a power distribution unit. The module 500, according to some embodiments, may accommodate a range of power cord diameters, by using inserts within the rotational connection 525 to effectively reduce the diameter of the connection. Using relatively small, low cost inserts to achieve the range of diameters provides the ability to provide a unique rotational apparatus for each input cord diameter.

Figure 8:
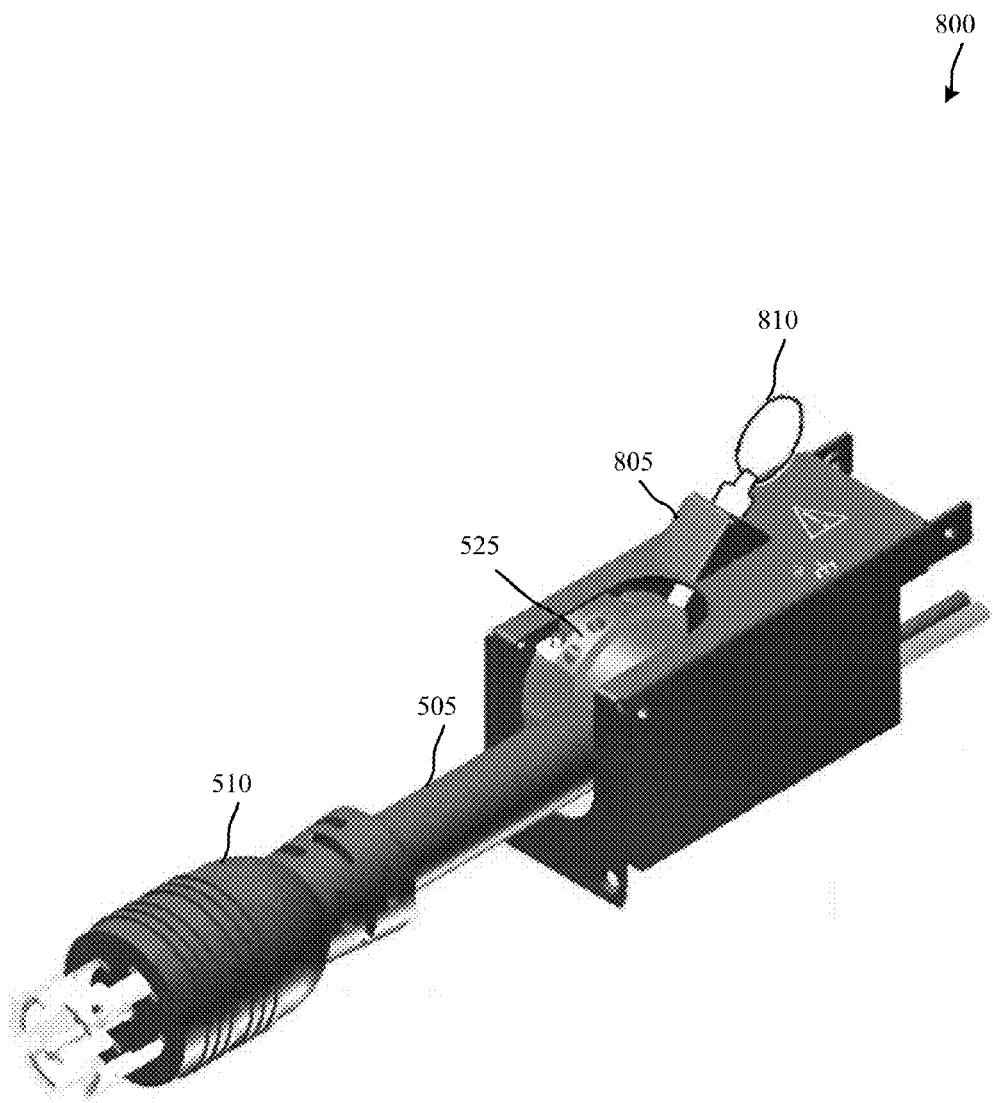
FIG. 8 illustrates an input cord swivel assembly according to various embodiments.

With reference now to FIG. 8, an input cord module 800 of other embodiments is described. In the illustration of FIG. 8, the input cord module 800 includes a locking mechanism 805 and a pull member 810 that may latch with rotational member 525 to secure input cord 505 at specific angles relative to the housing. In such a manner, the input power cord 505 may be held relatively securely in a predetermined position. Such a pull member provides the ability to change input power cord positions in a PDU without requiring tools.

Figure 9:
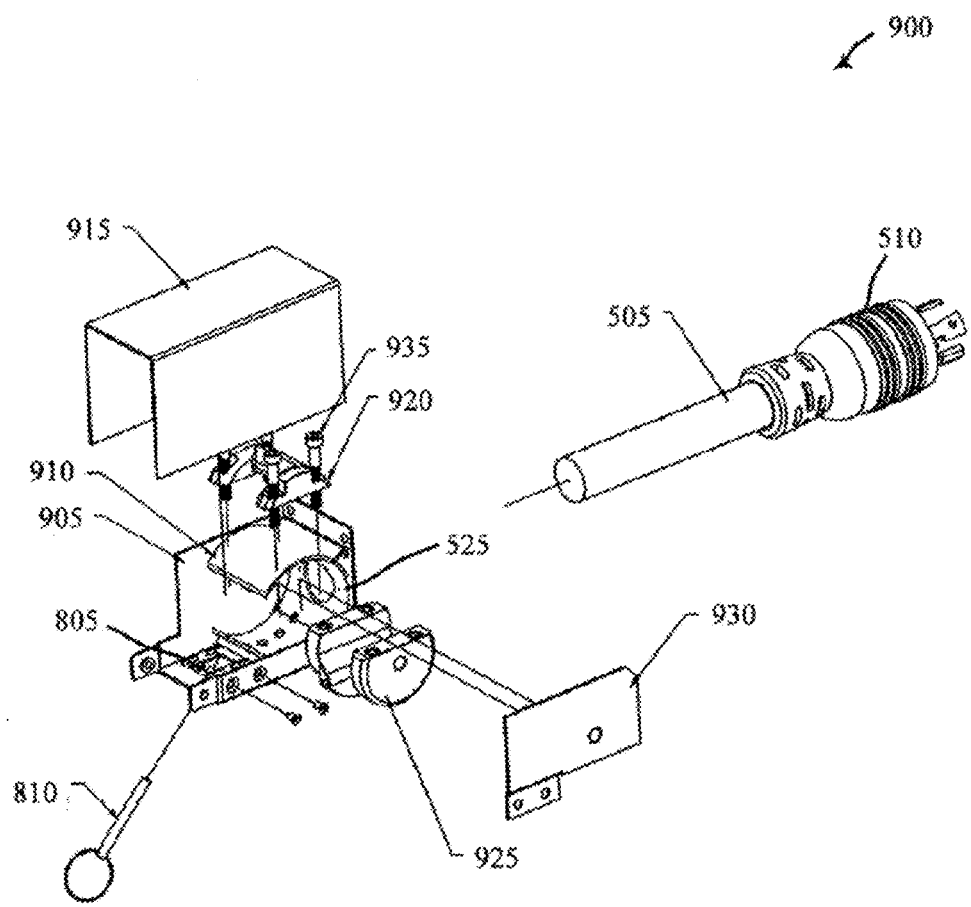
FIG. 9 illustrates another input cord swivel assembly according to various embodiments.

With reference to FIG. 9, an input cord module 900 of still other embodiments is described. In the illustration of FIG. 9, the input cord module 900 includes a locking mechanism 805 and a pull pin 810 that may engage with holes or cavities in the rotational member 525 to secure input cord 505 at specific angles relative to the housing. In such a manner, the input power cord 505 may be held relatively securely in a predetermined position. According to some embodiments, the rotational member 525 has holes to allow for five locked positions of the input cord 505, each position being approximately 22.5 degrees from adjacent positions. In the illustration of FIG. 9, the input cord module also includes a main enclosure member 905, a dust shield 910, an enclosure cover 915, a swivel upper housing 920, a swivel lower housing 925, and an enclosure plate 930. Each of these items is assembled to form input cord module 900, which, as can be seen, in an assembly of discrete components. In this embodiment, dust shield 910 serves to prevent foreign objects and/or internal components from passing between the module 900 and an adjacent portion of the PDU, which could result in safety or functionality concerns. Such a shield 910 allows the module 900 to be relatively compact while also serving to prevent passage of loose or molten materials from the PDU in the event of a catastrophic failure, for example. Enclosure cover 915 serves as a housing, or a portion of a housing for the module 900. Swivel upper and lower housings 920 and 925 may be secured together through hex screws 935, for example, with the power cord 505 compressed to be held within the assembled swivel upper and lower housings 920 and 925. Enclosure plate 930 may be assembled with the main enclosure member 905, as illustrated. Similarly as discussed above, the module 900 may be coupled with a PDU housing, or with other module that may be assembled to form a PDU.

According to some embodiments, the present disclosure also provides a method for assembling a power distribution unit. The method may be performed during initial assembly of a power distribution unit, such as the power distribution unit of FIG. 1, or may be a final portion of an assembly process, in which an input may be assembled with a PDU based on a particular customer needs related to input size, plug type, etc. In such embodiments, a housing may be provided that has an opening therethrough. A rotational member, such as rotational member 525, may be rotatably secured within the housing. A power cord may then be secured within the housing and coupled with the rotational member. When secured within the housing, the power input cord may extend through the opening, and the rotational member may be rotated into multiple different orientations relative to a longitudinal axis of the housing and thereby allow the power input cord to exit the housing at different angles. In some embodiments, a locking mechanism may also be coupled with the housing and with the rotational member. Such a locking mechanism may secure the rotational member at one of two or more different orientations within the housing, and may include, for example, a latch that may be secured with the rotational member. A barrier may also be secured at a first end of the housing adjacent to other portions of a power distribution unit, and may act to prevent passage of objects or materials through the first end. Furthermore, in some embodiments, one or more shims may be inserted into the rotational member to reduce an effective width of the rotational member to accommodate a range of power cord diameters.

Embodiments described herein provide several benefits relative to PDUs having a single fixed position for an input power cord. For example, embodiments provide that functions may be accomplished using fewer PDU part numbers. Manufacturing and purchasing may, as a result, be simplified. Assembly time and cost may be reduced, and reliability may be increased. Furthermore, embodiments may be used to produce a product that may require a smaller packaging footprint than products without such a feature. PDUs having multi-position input cords may also be more versatile and usable in a wider range of applications as compared to PDUs having a single fixed position for an input power cord.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A power input assembly apparatus, comprising:
   a housing comprising an opening therethrough;
   a rotational member located within the housing and rotatably secured to the housing;
   one or more inserts coupled with the rotational member to reduce an effective width of the rotational member; and
   a power input cord extending through the opening and coupled with the rotational member;
   wherein the rotational member is configured to be rotatable into two or more different orientations relative to a longitudinal axis of the housing and thereby allow the power input cord to exit the housing at two or more different angles.

2. The apparatus of claim 1, further comprising:
   a locking mechanism configured to secure the rotational member at one of two or more different orientations within the housing.

3. The apparatus of claim 2, wherein the locking mechanism comprises a latch that may be secured with the rotational member.

4. The apparatus of claim 1, further comprising:
   a barrier located at a first end of the housing adjacent to other portions of a power distribution unit, the barrier configured to prevent passage of objects or materials through the first end.

5. The apparatus of claim 1, wherein an exit point of the power input cord from the rotational member is oriented such that it minimizes movement of conductors within a power distribution unit.

6. The apparatus of claim 1, wherein the rotational member serves as a strain relief device for the power input cord.

7. The apparatus of claim 1, wherein the housing is a component of a power distribution unit.

8. The apparatus of claim 1, wherein the power input cord comprises a polyphase power input cord.

9. The apparatus of claim 1, wherein the rotational member is a multi-piece assembly.

10. A method for assembling a power distribution unit, comprising:
    providing a housing comprising an opening therethrough;
    rotatably securing a rotational member within the housing;
    inserting one or more shims into the rotational member to reduce an effective width of the rotational member to accommodate a selected power cord diameter; and
    securing a power cord within the housing and coupling the power cord with the rotational member, wherein, when secured within the housing, the power input cord extends through the opening; and
    wherein the rotational member is configured to be rotatable into two or more different orientations relative to a longitudinal axis of the housing and thereby allow the power input cord to exit the housing at two or more different angles.

11. The method of claim 10, further comprising:
    coupling a locking mechanism with the housing and with the rotational member, the locking mechanism configured to secure the rotational member at one of two or more different orientations within the housing.

12. The method of claim 11, wherein the locking mechanism comprises a latch that may be secured with the rotational member.

13. The method of claim 10, further comprising:
    securing a barrier at a first end of the housing adjacent to other portions of a power distribution unit, the barrier configured to prevent passage of objects or materials through the first end.

14. The method of claim 10, wherein the rotational member apparatus serves as a strain relief device for the power input cord.

15. A power distribution apparatus connectable to one or more electrical loads in an electrical equipment rack, comprising:
    an elongate housing extending along a longitudinal axis, the housing comprising a power input cord opening in an end portion of the housing;
    a rotational member rotatably secured to the housing proximate the power input cord opening;
    one or more inserts coupled with the rotational member to accommodate a selected power input cord diameter; and
    a power input cord extending between a proximal input portion and a distal plug portion, the proximal input portion being received in the power input cord opening and secured to the rotational member, thereby allowing the proximal input portion to project away from the housing transversely at different positions relative to the longitudinal axis of the housing.

16. The power distribution apparatus of claim 15, wherein the power input cord opening extends through at least two intersecting walls of the housing.

17. The power distribution apparatus of claim 16, wherein the proximal input portion extends in a first direction substantially aligned with the longitudinal axis of the housing in a first position, and the proximal input portion extends in a second direction substantially perpendicular to the longitudinal axis of the housing in a second position.

18. The power distribution apparatus of claim 15, further comprising:
   a locking mechanism configured to secure the power input cord at two or more different positions relative to the longitudinal axis of the housing.

19. The power distribution apparatus of claim 18, wherein the locking mechanism comprises a latch that is movable from an unlatched state to a latched state.

20. The power distribution apparatus of claim 15, wherein the power input cord comprises a polyphase power input cord.

21. The power distribution apparatus of claim 16, wherein one of the at least two intersecting walls is an end wall and the other of the at least two intersecting walls is a side wall.

* * * * *